No. 737,324. PATENTED AUG. 25, 1903.
N. H. BLOOM.
FLEXIBLE HARROW.
APPLICATION FILED JULY 15, 1902.
NO MODEL.
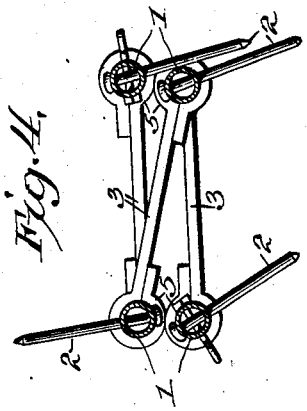
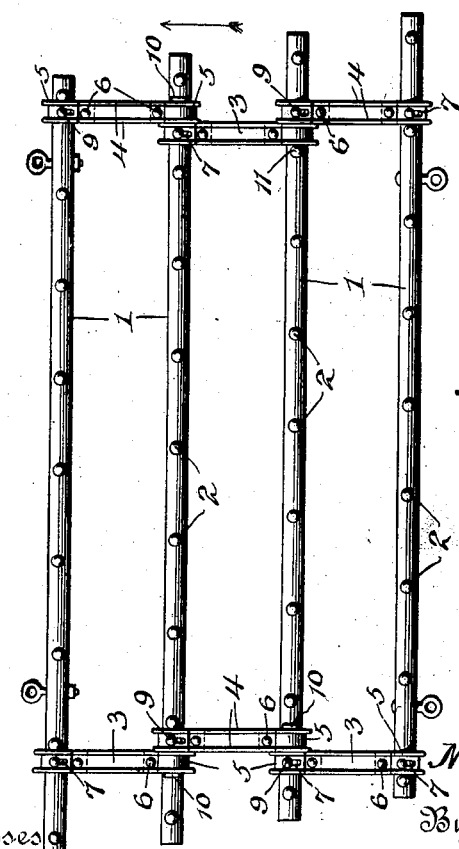
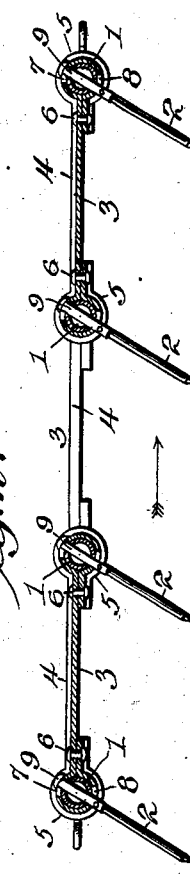
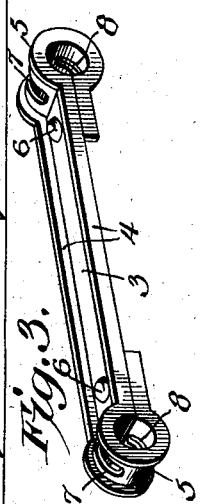
Witnesses
Howard D. Orr.
H. J. Shepard.
Nicklas H. Bloom, Inventor,
By E. G. Siggers,
Attorney
THE NORRIS PETERS CO., PHOTO-LITHO., WASHINGTON, D. C.

No. 737,324. Patented August 25, 1903.

UNITED STATES PATENT OFFICE.

NICKLAS H. BLOOM, OF NASHUA, IOWA.

FLEXIBLE HARROW.

SPECIFICATION forming part of Letters Patent No. 737,324, dated August 25, 1903.

Application filed July 15, 1902. Serial No. 115,710. (No model.)

*To all whom it may concern:*

Be it known that I, NICKLAS H. BLOOM, a citizen of the United States, residing at Nashua, in the county of Chickasaw and State of Iowa, have invented a new and useful Flexible Harrow, of which the following is a specification.

This invention relates to harrows, and has for its object to provide an improved connection between the harrow-bars whereby the latter are flexibly connected, so that they may yield in order that the teeth may pass over obstructions without becoming clogged, and thereby to impart a pounding as well as a scratching or scraping action to the teeth.

Another object is to have the connections between the harrow-bars entirely independent of the teeth, so that the draft is sustained by the bars, whereby a very strong and durable structure is provided.

Another object is to provide for hitching a team to either end of the harrow and in this connection to have the teeth stand vertical when the harrow is drawn in one direction and to incline downwardly and rearwardly when drawn in the opposite direction.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a plan view of the improved harrow. Fig. 2 is an enlarged sectional view showing the form of connection between the harrow-bars. Fig. 3 is an enlarged detail perspective view of one of the connecting-links. Fig. 4 is a detail transverse sectional view showing the harrow when folded.

Like characters of reference designate corresponding parts in all of the figures of the drawings.

The present harrow is made up of a plurality of substantially parallel bars 1, here shown as four in number; but it will of course be understood that any preferred number of bars may be used. The bars are preferably tubular and cylindrical in form, correspond in length, and instead of having their ends truly alined from front to rear they are offset regularly in an endwise direction from one end to the other of the harrow and are provided at regular intervals with teeth 2, whereby the teeth are staggered, so as to act upon a maximum of ground.

The connection between adjacent pairs of harrow-bars consists of a metallic link 3, which is in the form of a flat channel-bar having its longitudinal flanges 4 rising from the back of the bar, the ends of the bar being bent into cylindrical sleeves or eyes 5, which loosely embrace the respective bars, so as to permit rotation thereof within the sleeves or eyes. Each terminal of the bar after being bent into an eye or sleeve is disposed flat against the under side of the link and secured thereto by a rivet 6. While the link may be formed of a flat strap of metal without flanges, it is preferred to have the flanges, as the latter materially stiffen and strengthen the link without adding much weight thereto. One eye of each link is provided with upper and lower transverse slots 7 and 8, respectively, for the reception of a headed pin 9, which also passes through an opening in the harrow-bar, whereby the rotatable movement of the bar within the sleeve or eye is limited. The link shown in Fig. 3 has both of its sleeves or eyes slotted and is designed for use at one end of the harrow, so as to limit the rotation of the two adjacent harrow-bars.

As best indicated in Fig. 1, it will be seen that the front and rear links are in longitudinal alinement, while the intermediate link is disposed at one side thereof, preferably at the inner side of the links. To prevent lateral displacement of that end of the link which is not provided with slots, a pin 10 is passed transversely through the adjacent bar, so as to prevent lateral displacement of the link in one direction, it being held against displacement in the opposite direction by the end of the next adjacent link, which is connected to the bar by means of the pin 9. In some instances, as indicated at 11, one of the harrow-teeth may serve to prevent lateral displacement of one of the links.

When the harrow is drawn in the direction indicated by the arrow in Fig. 2, the drag upon the teeth causes the harrow-bars to rotate until stopped by contact of the pins 9 with the opposite ends of the slots 7 and 8, whereby the teeth will be maintained in an inclined position. When the harrow is traveling in the opposite direction, as in Fig. 1, the bars will be rotated to their opposite limits with the teeth standing upright.

To fold the harrow, as indicated in Fig. 4, one of the end bars is elevated. The pairs of links are folded alternately in regular succession, so as to bring the pairs of adjacent bars one above the other in compact relation, so as to materially reduce the size of the harrow for convenience in transportation and storage.

What I claim is—

1. A harrow having toothed bar members, and link members having opposite terminal rigid eyes rotatably receiving the bar members, one set of members being provided with slots, and the other set of members having projections working in the slots to limit rotation of the toothed bar members.

2. A harrow, comprising a plurality of toothed bars, links having opposite terminal rigid slotted eyes loosely receiving the toothed bars, and pins carried by the bars and working in the slots of the eyes to limit rotation of the bars.

3. A harrow, comprising a plurality of toothed bars, links having opposite terminal rigid eyes loosely receiving the toothed bars, an eye of each link having upper and lower slots which extend in opposite directions from the vertical center of the eye, and pins projected in opposite directions from the bars and working in the respective slots to limit rotation of the bars.

4. A harrow, comprising a plurality of toothed bars, links having their opposite ends bent into eyes loosely receiving the respective bars and also provided with opposite slots, and pins carried by the bars and working in the slots of the eyes to limit rotation of the bars.

5. A harrow comprising a plurality of toothed bars, connecting-links therefor, each link being longitudinally flanged at its opposite edges with its opposite ends bent into eyes loosely receiving the bars, one of the eyes being provided with opposite slots, and projections carried by the bars and working in the slots to limit the rotation of the bars.

6. A harrow, comprising a plurality of toothed bars, links pivotally connecting the bars and formed of channel-irons which have their end portions bent into eyes loosely receiving the bars, some of the eyes being provided with slots, the terminals of the links being riveted to the bodies thereof, and projections carried by the toothed bars and working in the slots to limit rotation of the bars.

7. A harrow, comprising a plurality of toothed bars, connecting-links having terminal eyes loosely receiving the toothed bars, the corresponding eyes of the links being provided with slots and both eyes of each link at one end of the harrow being slotted, and pins carried by the bars and working in the slots of the links to limit rotation of the bars.

8. A harrow, comprising a plurality of substantially parallel bars of corresponding length having cylindrical portions, teeth disposed at corresponding intervals throughout the lengths of the bars, the latter being offset endwise in the same direction from one end of the harrow, connecting-links having opposite terminal rigid eyes loosely receiving the cylindrical portions of the bars, some of the eyes being slotted, and pins carried by the bars and working in the slots to limit rotation of the bars.

In testimony that I claim the foregoing as my own I have hereto affixed my signature in the presence of two witnesses.

NICKLAS H. BLOOM.

Witnesses:
H. A. PARSON,
C. H. WAIT.